United States Patent
Morikawa et al.

(10) Patent No.: US 7,591,712 B2
(45) Date of Patent: Sep. 22, 2009

(54) METHOD OF PRODUCING SILICON BLOCKS AND SILICON WAFERS

(75) Inventors: Hiroaki Morikawa, Tokyo (JP); Shoichi Karakida, Tokyo (JP); Takafumi Kawasaki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 42 days.

(21) Appl. No.: 11/884,121

(22) PCT Filed: May 11, 2005

(86) PCT No.: PCT/JP2005/008603

§ 371 (c)(1), (2), (4) Date: Aug. 10, 2007

(87) PCT Pub. No.: WO2006/120736

PCT Pub. Date: Nov. 16, 2006

(65) Prior Publication Data

US 2008/0223351 A1   Sep. 18, 2008

(51) Int. Cl.
*B24B 1/00* (2006.01)

(52) U.S. Cl. .................. 451/36; 125/12; 125/16.02; 451/41; 451/60

(58) Field of Classification Search ............ 51/307, 51/309; 83/12, 22, 23, 24, 55; 106/3; 125/12, 125/13.01, 16.01, 16.02, 19, 21; 451/36, 451/41, 60; 216/89; 438/91, 692, 693
See application file for complete search history.

(56) References Cited

U.S. PATENT DOCUMENTS

| | | | |
|---|---|---|---|
| 3,715,842 A * | 2/1973 | Tredinnick et al. ............ 451/36 |
| 4,468,339 A * | 8/1984 | Rysek et al. .................. 252/75 |
| 5,817,711 A | 10/1998 | Kambe et al. |
| 6,228,816 B1 | 5/2001 | Ito et al. |
| 2002/0036182 A1 | 3/2002 | Kajimoto et al. |
| 2003/0136055 A1 * | 7/2003 | Li et al. .................. 51/298 |
| 2005/0072524 A1 * | 4/2005 | Mueller et al. ......... 156/345.11 |

(Continued)

FOREIGN PATENT DOCUMENTS

JP   02-262955   * 10/1990

(Continued)

OTHER PUBLICATIONS

International Search Report dated Jul. 11, 2005.

*Primary Examiner*—Timothy V Eley
(74) *Attorney, Agent, or Firm*—Buchanan Ingersoll & Rooney PC

(57) ABSTRACT

A method of producing silicon blocks by cutting a silicon ingot is provided. The method uses a silicon ingot cutting slurry containing abrasive grains and an alkaline substance so as to provide the silicon blocks that can be produced into silicon wafers each having a thin thickness with reduced substrate damage at the time of producing a solar battery. The alkaline substance has a content mass that is at least 3.5% with respect to the mass of the entire liquid components of said slurry, and the slurry contains an organic amine having a mass ratio of 0.5 to 5.0 with respect to water in the liquid components of the slurry. The slurry is used at a pH of 12 or more and at a temperature of from 65 to 95 degrees C.

3 Claims, 2 Drawing Sheets

U.S. PATENT DOCUMENTS

2006/0075687 A1* 4/2006 Tsuruta et al. .............. 51/307

FOREIGN PATENT DOCUMENTS

| JP | 8-57847 A | 3/1996 |
| JP | 10-53789 A | 2/1998 |
| JP | 11-349979 A | 12/1999 |
| JP | 2001-164284 A | 6/2001 |
| JP | 2002-176014 A | 6/2002 |
| JP | 2002-252188 A | 9/2002 |
| JP | 2004-6997 A | 1/2004 |
| JP | 2005-88394 A | 4/2005 |

* cited by examiner

METHOD OF PRODUCING SILICON BLOCKS AND SILICON WAFERS

TECHNICAL FIELD

The present invention relates to a method of producing silicon blocks from a polycrystalline ingot for production of a silicon wafer for use with a solar battery, and to a method of producing silicon wafers by using the silicon blocks thus produced by such a producing method.

BACKGROUND ART

Polysilicon wafers used to produce solar batteries are manufactured by producing a polysilicon ingot of a quadratic prism, cutting out from the polysilicon ingot a multitude of polysilicon blocks each in the shape of a quadratic prism by the use of a bandsaw, etc., and further by slicing each polysilicon block into quadrangular plates.

When the bandsaw is used upon cutting out the silicon blocks from the silicon ingot, surfaces of the blocks might be damaged, and if silicon wafers are produced without removing such damaged parts, there arises a problem that cracks might occur in the following processes after the production of the silicon wafers, resulting in a reduction in the yield of the products. Accordingly, the side surfaces of the silicon blocks are mechanically polished (see, for example, a first patent document).

First patent document: Japanese patent application laid-open No. 2004-6997

DISCLOSURE OF THE INVENTION

Problems to be Solved by the Invention

First of all, an alkaline slurry is used to suppress to a minimum the damage of the block surfaces conventionally generated when the silicon blocks are cut out from the silicon ingot. Then, as described in the background art, there can be seen a phenomenon that even if mechanical polishing is applied to the side surfaces of the silicon blocks in such a manner that the surface roughness after polishing becomes 8 μm or less, the damage of a substrate might occur at the time of production of a solar battery using silicon wafers, so the yield of the product might be reduced.

The object of the present invention is to provide an improved method of producing silicon blocks and silicon wafers in which the yield of products can be improved by examining the relation between the state of silicon wafers and cracks.

Means for Solving the Problems

A method of producing a silicon block according to the present invention resides in a method of cutting a silicon ingot by the use of a silicon ingot cutting slurry containing abrasive grains and an alkaline substance, wherein the content of said alkaline substance is at least 3.5 mass % with respect to the mass of the entire liquid components of said slurry; said slurry contains an organic amine of from 0.5 to 5.0 by a mass ratio with respect to the water in the liquid components of said slurry; the pH of said slurry is 12 or higher; and said slurry is used at a temperature of from 65 to 95 degrees C.

In addition, a silicon block according to the present invention resides in a silicon block which is cut out from a silicon ingot and sliced to a plurality of silicon wafers each having a predetermined thickness irrespective of whether said alkaline slurry is used, wherein the surface roughness of a side surface of said silicon block corresponding to an edge face of each of said sliced silicon wafers each having a thickness of 280 μm is less than 3 μm.

Further, the surface roughness of a side surface of said silicon block corresponding to an edge face of each of said sliced silicon wafers each having a thickness of 240 μm is 1 μm or less.

EFFECT OF THE INVENTION

In a silicon block according to the present invention, by making the content of the alkaline substance be at least 3.5 mass % with respect to the mass of the entire liquid components of said slurry and said slurry contain an organic amine of from 0.5 to 5.0 by a mass ratio with respect to the water in the liquid components of said slurry, and by adjusting the pH of the slurry to be 12 or more, the surface roughness of a cutting surface of the silicon block cut out from the silicon ingot can be made fine.

Further, a silicon block is cut out from a silicon ingot in such a manner that the surface roughness of a side surface of said silicon block corresponding to an edge face of each of said sliced silicon wafers each having a thickness of 240 μm is 1 μm or less irrespective of the use of such an alkaline slurry, and the surface roughness of a side surface of said silicon block corresponding to an edge face of each of said sliced silicon wafers each having a thickness of 280 μm is less than 3 μm or less. As a result, in the case of producing a solar battery, damage to a substrate is small, similar to the case where a solar battery is formed of silicon wafers sliced to a thickness of 330 μm.

BEST MODE FOR CARRYING OUT THE INVENTION

Figure 1:
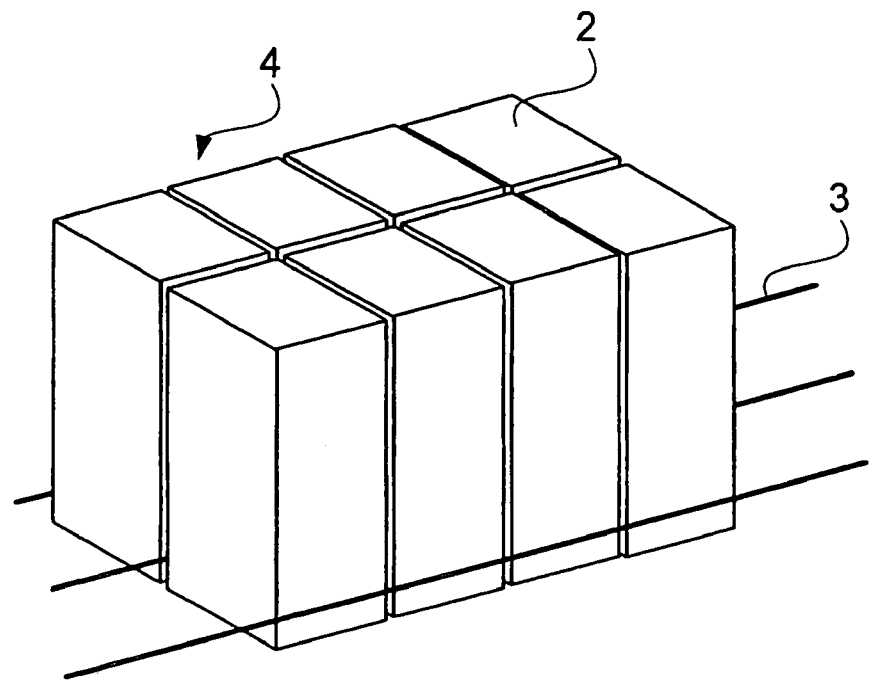
FIG. 1 is a view showing the way in which a silicon ingot is cut into silicon blocks.
Figure 2:
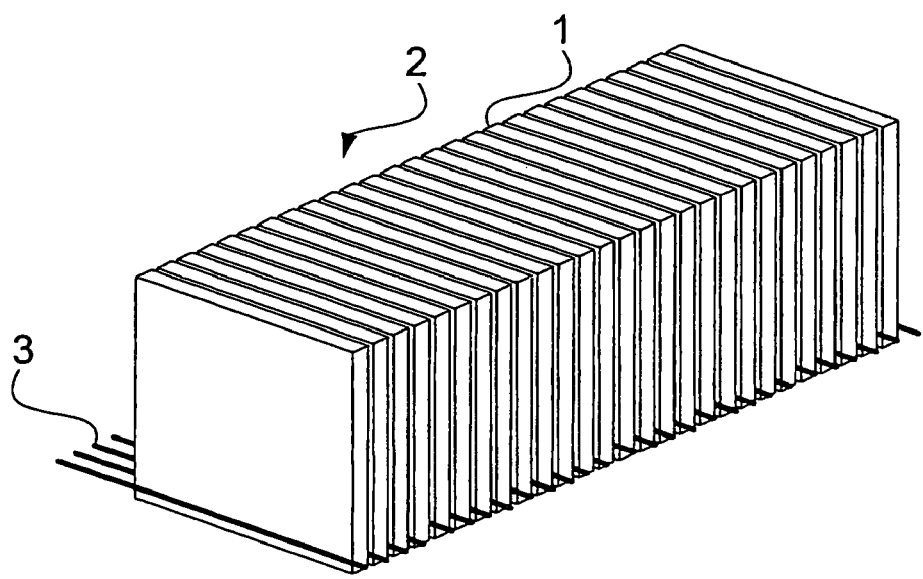
FIG. 2 is a view showing the way in which a silicon block is sliced into silicon wafers.

FIG. 1 is a view that shows the way in which a silicon ingot is cut to silicon blocks in the present invention, and FIG. 2 is a view that shows the way in which a silicon block is sliced to silicon wafers in the present invention.

The present invention relates to the characteristic of a semiconductor block associated with the production of polysilicon semiconductor wafers used in producing a solar battery. Although silicon is generally widely adopted as such semiconductor, the present invention can also be applied to gallium arsenide alloys, germanium, silicon carbide alloys and the like.

In the following explanation, description will be made by taking polysilicon as an example.

As shown in FIG. 1, polysilicon blocks 2 are produced by cutting a polysilicon ingot 4 while supplying a silicon ingot cutting slurry to cutting equipment, and the polysilicon blocks 2 are produced by cutting the polysilicon ingot 4 in such a manner that they have a desired cross-sectional shape. Usually, such a shape is a square prism, and the polysilicon ingot 4 is produced by casting polysilicon powder into a square prism by means of a casting method.

The silicon ingot cutting slurry according to the present invention contains abrasive grains and an alkaline substance. The content of the alkaline substance is at least 3.5 mass % with respect to the mass of the entire liquid components of the slurry, and the slurry further contains organic amine of a mass ratio of from 0.5 to 5 with respect to the water in the liquid components of the slurry, with the pH of said slurry being 12 or higher.

In addition, the abrasive grains may be any material generally used as an abrasive, and there can be enumerated, for example, silicon carbide, ceric oxide, diamond, boron nitride, aluminum oxide, zirconia, silicon dioxide and so on, and these substances can be used independently of one another or in combination of two or more kinds thereof. The compounds that can be used for such abrasive grains are available on the market, and specifically, trade names GC (Green Silicon Carbide) and C (Black Silicon Carbide) (manufactured by Fujimi Incorporated) are enumerated as silicon carbide, and trade names FO (Fujimi Optical Emery), A (Regular Fused Alumina), WA (White Fused Alimina), and PWA (Platelet Calcined Alimina) (manufactured by Fujimi Incorporated), etc., are enumerated as aluminum oxide.

Though not particularly limited, the mean particle size of the abrasive grains is preferably from 1 μm to 60 μm, and more preferably from 5 μm to 20 μm. When the mean particle size of the abrasive grains is less than 1 μm, the speed of cutting becomes remarkably slow and is hence not practicable, whereas when the mean particle size of the abrasive grains exceeds 60 μm, the surface roughness of the side surface of the silicon block 2 after cutting thereof might become large, so it is not desirable.

Also, though not particularly limited, the content of the abrasive grains is preferably from 20 mass % to 60 mass % with respect to the mass of the entire silicon ingot cutting slurry. Here, note that if the content of the abrasive grains is less than 20 mass %, the cutting speed might become slow and not practical, whereas the content of the abrasive grains exceeds 60 mass %, the viscosity of the slurry becomes excessively large, so the slurry might not be easily introduced into the cutting interface.

In the present invention, as the alkaline substance, there may be used any material that acts as a base in the slurry, and for example, metal hydroxides can be enumerated. More specifically, alkali metal hydroxides such as lithium hydroxide, sodium hydroxide, potassium hydroxide and the like, and alkaline earth hydroxides such as magnesium hydroxide, calcium hydroxide, barium hydroxide and the like can be enumerated, and these can be used independently of one another or in combination of two or more kinds thereof. From among these, the alkali metal hydroxides are preferable from the viewpoint of the reactiveness thereof with the silicon ingot 4.

The content of an alkaline substance is at least 3.5 mass %, and preferably at least 4.0 mass %, with respect to the mass of the entire liquid components of the silicon ingot cutting slurry, and it is preferably 30 mass % or less, and more preferably, 20 mass % or less. In case where the content of the alkaline substance is too small, the cutting resistance is not reduced to a satisfactory extent, whereas in case where it is too much, the pH of the slurry is saturated so the cutting resistance is not reduced to such an extent as expected in accordance with the increasing amount of addition thereof, resulting in increased waste in the cost, and hence both of these cases are not desirable.

The silicon ingot cutting slurry according to the present invention contains an organic amine other than the abrasive grains. In the present invention, the organic amine is different from conventional thickeners such as suntan gum, polyvinyl alcohol and so on, and acts as a substance that serves to enhance the chemical action of the slurry as well as to suppress the change in viscosity of the slurry during a cutting operation. As such an organic amine, any well-known one can be used without any limitation, and for example, alkanolamines such as monoethanol amines, diethanolamines and triethanolamines, aliphatic amines, alicyclic amines, and aromatic amines are enumerated. These can be used independently of one another or in combination of two or more kinds thereof. Among these, alkanolamines are preferable, and triethanolamines are preferable from the viewpoint of the cost and ease of handling.

The content of the organic amines in the slurry has a mass ratio in the range from 0.5 to 5.0 with respect to the water in the liquid components of the slurry, and preferably in the range of from 1.0 to 4.0. In case where the mass ratio of the organic amine with respect to the water in the liquid components of the slurry is less than 0.5, not only the change in viscosity of the slurry during the cutting operation is unable to be suppressed to a satisfactory extent, but also the initial viscosity of the slurry becomes low, and hence such a case is undesirable. In addition, the organic amine does not have so strong basicity as that of alkaline substances, so the pH of the slurry does not change greatly under a kind of buffer action when the mass ratio of the organic amine with respect to the water in the liquid components of the slurry is 5.0 or less. However, when the mass ratio of the organic amine with respect to the water in the liquid components of the slurry exceeds 5.0, the chemical action of the slurry becomes dull to reduce the cutting speed, and hence this is undesirable.

In addition, though the initial viscosity of the silicon ingot cutting slurry according to the present invention is not particularly limited, a viscosity of from 50 to 120 mPa·s is preferable with the use of a rotational viscosimeter (e.g., a programmable rheometer DV-III manufactured by Brookfield Engineering) at 90 degrees C. and at a shear rate of 57.6 $[s^{-1}]$. If the initial viscosity of the silicon ingot cutting slurry is too low, the slurry coated on a wire might become liable to drip down easily, whereas if the initial viscosity is too high, the amount of slurry supplied to the silicon ingot cutting portion becomes short. Also, though the viscosity of the slurry during the cutting operation is not particularly limited, a viscosity of equal to or less than 160 mPa·s is preferable with the use of a rotational viscosimeter (e.g., a programmable rheometer DV-III manufactured by Brookfield Engineering) at 90 degrees C. and at a shear rate of 57.6 $[s^{-1}]$, and a viscosity of equal to or less than 120 mPa·s is more preferable. If the viscosity of the slurry during the cutting operation is too high, the uniform distribution of the slurry in the silicon ingot cutting section is disturbed, so the cutting speed might be reduced and the wire might be broken In the present invention, water, a well-known coolant and a mixture thereof can be used as the liquid components of the slurry. The water used here is preferably one containing a small impurity content but is not limited to this. Specifically, pure water, extra pure water, city water, industrial water and so on are enumerated.

Also, though not particularly limited, the content of the water is preferably from 10 mass % to 40 mass % with respect to the mass of the entire silicon ingot cutting slurry.

In addition, the coolant may be one which is generally used as a cutting assisting liquid mixture including polyethylene glycol, benzotriazole, oleic acid, etc. Such a coolant is commercially available on the market, and specifically, there may be enumerated trade names such as Multirikanol (manufactured by Rikashokai Co., Ltd.), Lunacoolant (manufactured by Ohtomo Chemical Ins., Corp.), etc.

Also, though not particularly limited, the content of the coolant is preferably from 10 mass % to 40 mass % with respect to the mass of the entire silicon ingot cutting slurry.

The silicon ingot cutting slurry according to the present invention has a strong basicity due to a basic material therein. Accordingly, the silicon ingot cutting interface is made weak by a reaction shown in the following expression (1), and at the same time is lapped by the abrasive grains.

$$Si+4H_2O \rightarrow Si(OH)_4+2H_2 \tag{1}$$

As can be seen from the above expression, the higher the pH of the slurry (the stronger the basicity thereof), the more is the reaction of silicon facilitated. Thus, the silicon ingot cutting slurry according to the present invention has a pH of 12 or more, preferably 13 or more. When the pH of the slurry is too low, the reaction (weakening) speed of silicon is low, and the cutting speed can not be improved, so this is not desirable.

Further, the silicon ingot cutting slurry of the present invention is used at a temperature of from 65 degrees C. to 95 degrees C. When the temperature at which the slurry is used is less than 65 degrees C., the reaction is not activated and the cutting resistance is not reduced to a satisfactory extent, whereas when the temperature exceeds 95 degrees C., water necessary for the reaction is insufficient because of the evaporation of the liquid components (mainly water) in the slurry, so the cutting resistance increases, and hence this is not desirable.

A variety of kinds of well-known additives may be added to the silicon ingot cutting slurry of the present invention in accordance with the purpose to keep the quality of products and to stabilize the performance thereof, or in accordance with the kind, the processing condition, etc., of the silicon ingot 4. As such additives, there may be enumerated, for example, moisturizing agents, lubricants, corrosion inhibitors, chelating agents such as ethylene diamine tetraacetic acid sodium, and abrasive grains dispersion adjuvants such as bentonite.

The silicon ingot cutting slurry of the present invention can be prepared by mixing the above-mentioned individual components at a desired ratio. The method of mixing individual components is arbitrary and can be performed, for example, by stirring them with a wing type agitator. Also, the mixing order of the individual components is arbitrary, and in addition, the silicon ingot cutting slurry thus prepared may be subjected to further processing such as, for example, filtering processing, ion exchanging processing, etc., for the purpose of refinement, etc.

A cutting device is used in the method of cutting the silicon ingot 4 according to the present invention. As such a cutting apparatus used here, any arbitrary one can be used, but there are enumerated, for example, a bandsaw, a wire saw, a multi-band saw, a multiwire saw, an outer peripheral edge cutting device, and an inner peripheral edge cutting device. When an ingot having a large diameter of 50 cm or more for example is cut, the wire saw is particularly preferable among these saws and cutting devices. This is because the ingot can be cut with a small cutting margin in comparison with other cutting devices.

A polysilicon wafer 1 is produced by slicing a polysilicon block 2 to a desired thickness with the use of a wire 3, as shown in FIG. 2. Usually, the wafer thus produced is a rectangular plate.

Here, an explanation will be made of an evaluation measure for the surface roughness of a side surface of the silicon block 2. Here, note that a maximum height Ry is used as the surface roughness. In addition, the maximum height Ry is measured by using a SURFCOM480M manufactured by Tokyo Seimitsu Co., Ltd. under the following conditions: a stylus diameter is 5 µm (a cone at 90 degrees C.); an evaluation length is 2 mm; a measurement speed is 0.6 mm; and a cutoff value is 0.25 mm. In addition, the side surface to be measured of the silicon block 2 is a side surface that remains as an edge face of the silicon wafer 1 obtained by slicing the silicon block. For example, in case of a square prism, it is four side surfaces, and in case of a circular column, a side circumferential surface.

A damage or failure rate Y is a ratio of a portion of silicon wafers 1 damaged when a solar battery has been prepared by using the silicon wafers 1 obtained by slicing a single silicon block 2.

Also, a failure rate Y (0.8, 330) obtained when a solar battery was prepared by using silicon wafers 1 each having a thickness t of 330 µm that were cut out from a silicon block 2 with a side surface having a surface roughness Ry of 0.8 µm, the failure rate of which is the lowest, is set to 0. In addition, a failure rate Y (3.5, 240) obtained when a solar battery was prepared by using silicon wafers 1 each having a thickness t of 240 µm that were cut out from a silicon block 2 with a side surface having a surface roughness Ry of 3.5 µm, the failure rate of which is the highest, is set to 1.

Thus, a substrate damage improvement rate I during production of the solar battery can be obtained from the following expression (2) with a failure rate A(Ry, t), when the surface roughness Ry of the side surface of the silicon block 2 and the thickness t of the silicon wafer 1 are made variable, being set as a relative value between 1 and 0 as referred to above.

$$I=\{A(3.5, 240)\cdot A(Ry, t)\}/\{A(3.5, 240)-A(0.8, 330)\} \tag{2}$$

Experiments were carried out under the above-mentioned experimental condition so as to investigate the relation between the state of the silicon wafers and cracks, and the frequency of occurrences of cracks in post processing was examined. Here, note that the frequency of occurrences of cracks is represented by replacement thereof with the above-mentioned substrate damage improvement rate In this experiment, first of all, six kinds of silicon blocks 2 having surface roughnesses Ry of their side surfaces of 0.8, 0.9, 2.6, 3.0, 3.5 and 4.3 µm, respectively, were prepared. Then, silicon wafers 1 having three kinds of thicknesses of 330 µm, 280 µm and 240 µm, respectively, were cut out from these silicon blocks 2. Thereafter, solar batteries were prepared by using the silicon wafers obtained by slicing the individual silicon blocks 2, and the substrate damage improvement rate was calculated from the failure rate at that time, and was illustrated in FIG. 3.

Figure 3:
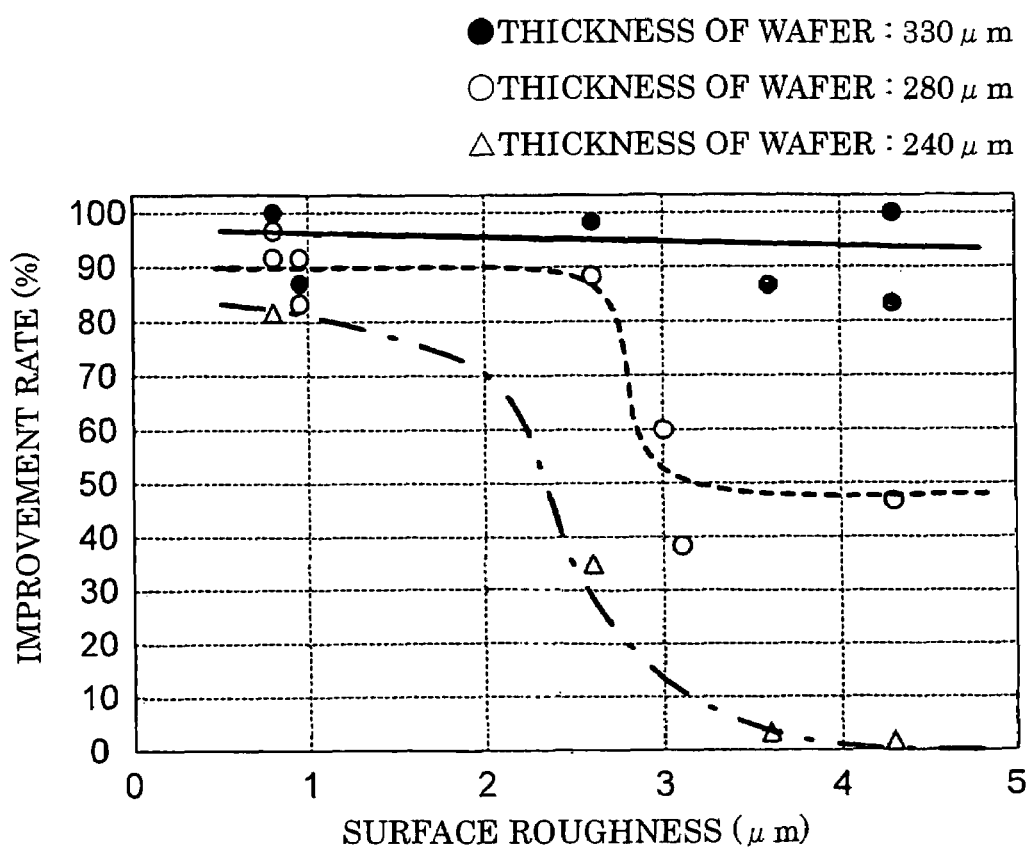
FIG. 3 is a view showing the relation between the surface roughness and the rate of improvement of a side surface of a silicon block.

As can be seen from FIG. 3, it appears that the substrate damage improvement rate at the time when the thickness of a silicon wafer 1 to be cut out is 330 µm has a tendency that its variation becomes large to some extent in a region in which the surface roughness exceeds 3 µm, but the substrate damage improvement rate still exceeds 80% and hence it is considered that there is no problem in practical use. Accordingly, it can be said that in case where the thickness of each silicon wafer 1 is 330 µm, the surface roughness does not influence the substrate damage improvement rate if the surface roughness of the side surface of the silicon block 2 is at least 5 µm or less.

However, the substrate damage improvement rate at the time when the thickness of each silicon wafer 1 to be cut out is 280 µm, the surface roughness of the side surface of the silicon block 2 rapidly changes between 2.6 µm and 3 µm. The substrate damage improvement rate of each silicon wafer 1 cut out from the silicon block 2 having a surface roughness of 3 µm or more reaches from 40% to 50%, and remains substantially at the same level up to a measurement upper limit of 4.3 μm in the current experiment. On the other hand, the substrate damage improvement rate of each silicon wafer 1 cut out from the silicon block 2 having a surface roughness of 2.6 μm or less reaches about 90%, and remains substantially constant at that level up to a measurement lower limit of 0.8 μm in the current experiment, so the variation of the substrate damage improvement rate becomes within ±5%.

Further, the substrate damage improvement rate at the time when the thickness of each silicon wafer 1 to be cut out from the silicon block 2 is thinned to 240 μm does not change so steeply as in the case of 280 μm, but it begins to extremely decrease from the point where the surface roughness of the side surface exceeds about 2.3 μm, and becomes substantially 0% when 3 μm is exceeded, and remains at the same level from there up to at least 4.3 μm. On the other hand, as the surface roughness decreases less than 2.3 μm, the substrate damage improvement rate begins to increase and reaches substantially 80% at around 1 μm, and becomes substantially the same level as that value therebelow.

When the thickness of each silicon wafer 1 and the surface roughness of the side surface of the silicon block 2 were changed so as to examine the relation therebetween, it was found that the value of the surface roughness, at which the substrate damage improvement rate greatly changes, varies in accordance with the thickness of each silicon wafer 1.

For example, when sliced into silicon wafers 1 each having a thickness of 280 μm, a silicon block 2 with a side surface having a surface roughness of 2.6 μm or less is prepared, whereas when sliced into silicon wafers 1 each having a thickness of 240 μm, a silicon block 2 with a side surface having a surface roughness of 1 μm or less is prepared, and in either case, it is preferred that as a silicon ingot cutting slurry, there be used one which contains abrasive grains and an alkaline substance, with the content of the alkaline substance being at least 3 mass % with respect to the mass of the entire liquid components of the slurry, and which further contains an organic amine of from 0.5 to 5.0 by a mass ratio with respect to water in the liquid components of the slurry, with the pH of the slurry being 12 or more.

In addition, in case where the thickness of each silicon wafer 1 is 280 μm, the substrate damage improvement rate remains constant or unchanged at 50% when the surface roughness of silicon block 2 is from about 3 μm up to about 4.3 μm, as stated above, but as the surface roughness is made further coarser, a crack yield improvement rate decreases to 0% (i.e., the substrate damage improvement rate decreases to 0%). Accordingly, depending upon the thickness of each silicon wafer 1, there are a plurality of points at which the substrate damage improvement rate changes greatly from a region where it becomes constant or unchanged, so as the surface roughness of the silicon block 2 is made to decrease, even if a region was found in which the surface roughness of the silicon block 2 once becomes constant or unchanged, there is still a possibility that there exists a region in which the substrate damage improvement rate is greatly improved.

Further, since the thickness of each silicon wafer 1 may be made thin, it is necessary to adjust the surface roughness of the side surface of the silicon block 2 to a value equal to or less than an upper limit value of a region in which the substrate damage improvement rate becomes 80% or more.

According to such a silicon block producing method, silicon blocks 2 are produced by cutting a silicon ingot 4 by the use of a slurry that contains abrasive grains and an alkaline substance. As a result, there is no need to polish the side surface of each silicon block separately after cutting thereof, so such a process can be eliminated, thus making it possible to provide silicon wafers at low cost.

The invention claimed is:

1. A method of producing silicon wafers, the method comprising:
    cutting out a silicon block from a silicon ingot while supplying a silicon ingot cutting slurry, the silicon block having a predetermined surface roughness; and
    cutting out the silicon wafers from the silicon block, each silicon wafer having a predetermined thickness, wherein
    the silicon ingot cutting slurry contains abrasive grains and an alkaline substance,
    the slurry contains an organic amine having a mass ratio of 0.5 to 5.0 with respect to water in liquid components of the slurry,
    the slurry is used at a pH of 12 or more and at a temperature of from 65 to 95 degrees C., and
    the predetermined surface roughness is adjusted to be less than or equal to an upper limit value of a region in which a substrate damage improvement rate becomes 80% or more.

2. A method of producing silicon wafers as set forth in claim 1, wherein the predetermined surface roughness is adjusted to less than 3 μm when the predetermined thickness of each silicon wafer is 280 μm.

3. A method of producing silicon wafers as set forth in claim 1, wherein the predetermined surface roughness is adjusted to equal to or less than 1 μm when the predetermined thickness of each silicon wafer is 240 μm.

* * * * *